United States Patent [19]
Dirmeyer et al.

[11] Patent Number: 5,748,075
[45] Date of Patent: May 5, 1998

[54] CONTROL UNIT WITH AN AIR PRESSURE DETECTOR FOR A VEHICLE PASSENGER PROTECTION SYSTEM

[75] Inventors: Josef Dirmeyer, Bodenwöhr; Heinrich Probst, Tegernheim; Peter Bauer; Robert Gruber, both of Regensburg; Gerhard Mader, Thalmassing; Manfred Frimberger, Kläham; Lorenz Pfau, Regensburg, all of Germany

[73] Assignee: Siemens Aktiengesellschaft, Munich, Germany

[21] Appl. No.: 592,370

[22] PCT Filed: Nov. 5, 1993

[86] PCT No.: PCT/DE93/01059

§ 371 Date: Jan. 29, 1996

§ 102(e) Date: Jan. 29, 1996

[87] PCT Pub. No.: WO94/11223

PCT Pub. Date: May 26, 1994

[30] Foreign Application Priority Data

Nov. 11, 1992 [DE] Germany ............... 9215382 U
Jul. 6, 1993 [DE] Germany ............... 43 22 488.1

[51] Int. Cl.[6] .................................................. B60Q 1/00
[52] U.S. Cl. ................... 340/436; 340/425.5; 280/734; 280/735; 180/274; 367/93
[58] Field of Search ............................. 340/436, 438, 340/425.5, 426; 180/274, 275, 276, 277, 278; 280/730.2, 734, 735; 310/322, 334; 367/93, 94

[56] References Cited

U.S. PATENT DOCUMENTS

| | | | |
|---|---|---|---|
| 3,862,669 | 1/1975 | Lindbert et al. | 180/274 |
| 4,333,028 | 6/1982 | Panton | 310/326 |
| 4,346,914 | 8/1982 | Livers et al. | 280/735 |
| 4,712,098 | 12/1987 | Laing | 340/436 |
| 4,842,301 | 6/1989 | Feldmaier | 280/735 |
| 4,929,925 | 5/1990 | Bodine et al. | 340/436 |
| 4,991,145 | 2/1991 | Goldstein et al. | 367/94 |
| 5,109,341 | 4/1992 | Blackburn et al. | 340/436 |
| 5,387,819 | 2/1995 | Ueno et al. | 340/436 |
| 5,390,951 | 2/1995 | Iyoda | 340/436 |
| 5,428,534 | 6/1995 | Wetzel et al. | 340/436 |
| 5,546,307 | 8/1996 | Mazur et al. | 340/436 |

FOREIGN PATENT DOCUMENTS

| | | |
|---|---|---|
| 0305654 | 3/1989 | European Pat. Off. |
| 305 655 B1 | 3/1989 | European Pat. Off. |
| 0445907 | 9/1991 | European Pat. Off. |
| 1944289 | 3/1971 | Germany |
| 3729019 | 8/1991 | Germany |
| 4129997 | 3/1993 | Germany |

*Primary Examiner*—Jeffery Hofsass
*Assistant Examiner*—Ashok Mannava
*Attorney, Agent, or Firm*—Herbert L. Lerner; Laurence A. Greenberg

[57] ABSTRACT

A control assembly for a passenger protection system of a vehicle which is tripped upon the occurrence of a side impact traffic accident. The control assembly has at least one detector adapted to detect a pressure rise in a hollow body. The at least one detector is mounted in a largely enclosed side portion on the side of the vehicle body defining a hollow body such as a door. A control unit is connected to and receives signals from the at least one detector. The control unit evaluates a sudden and largely adiabatic air pressure rise detected by the detector upon a side impact collision and determines whether to actuate a passenger protection system such as an air bag.

16 Claims, 4 Drawing Sheets

PIEZO-RESISTIVE PRESSURE SENSOR CENTRALLY MOUNTED IN THE INSIDE DOOR PANEL.

PIEZO-RESISTIVE PRESSURE SENSOR CENTRALLY MOUNTED IN THE INSIDE DOOR PANEL.

AIR PRESSURE DETECTOR

PRESSURE WAVE

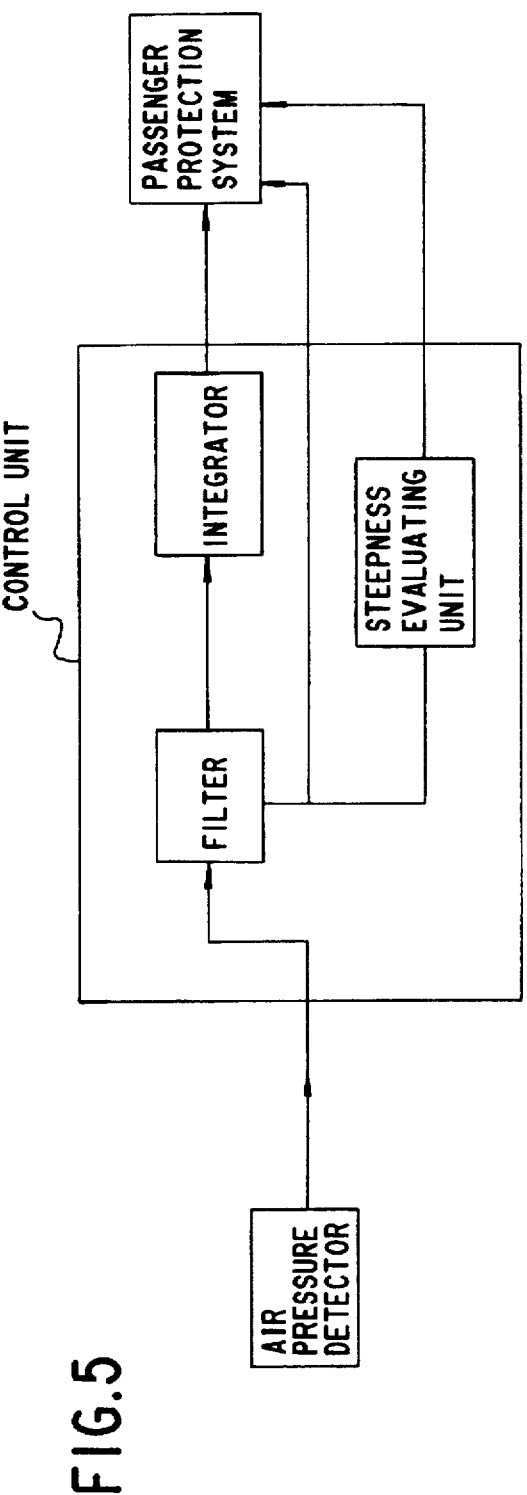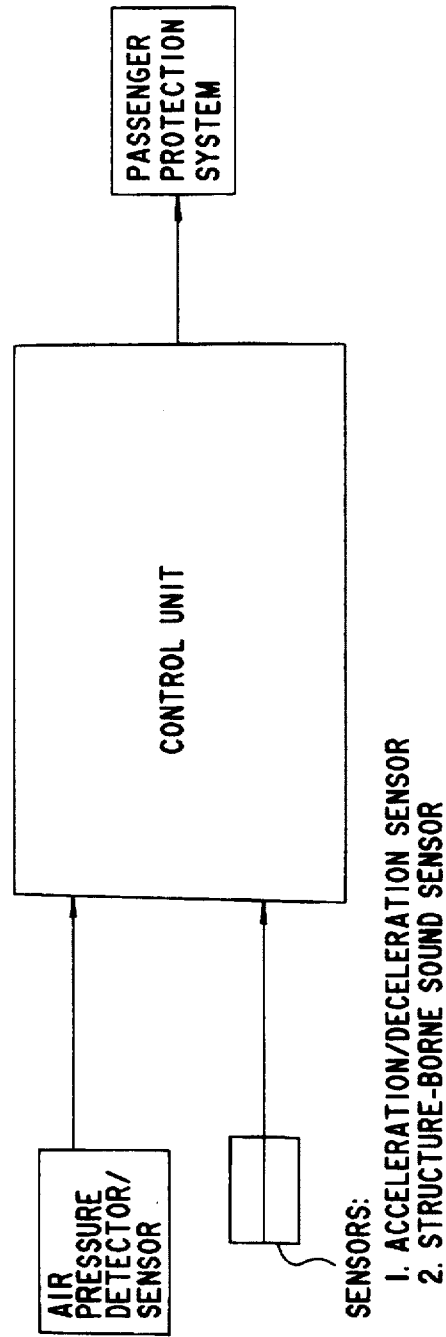

16
CONTROL UNIT WITH AN AIR PRESSURE DETECTOR FOR A VEHICLE PASSENGER PROTECTION SYSTEM

BACKGROUND OF THE INVENTION

FIELD OF THE INVENTION

The invention was developed above all for timely detection of side collision accidents in on-road vehicles, whose passenger protection system is tripped by means of the output signal of a sensor that detects the traffic accident. In principle, however, it is also suitable for detecting other kinds of collisions, in which portions of the vehicle are deformed.

In the accident, surges and vibrations occur at the deformed impact site, and these surges and vibrations are propagated, at the speed of structure-borne sound via mechanically fixed parts of the vehicle, and/or at the speed of airborne sound via the air, from the impact site to the sensor that furnishes the electronics of the passenger protection system control unit with data about the detected accident.

Many sensors are known that enable detecting not only a traffic accident but also its severity, and that optionally enable tripping a passenger protection system, such as an air bag system. Only if the accident is serious enough should the passenger protection system be tripped—but if so, then as reliably as possible—while conversely, in a minor accident it should not yet be tripped. An example of a serious accident is a side collision with a truck or a sturdy tree at relatively high speed, such as above a relative speed of 25 km/h. A minor accident is one in which this relative speed is especially low and/or if only a lightweight object, such as a bicycle, dents the side door a little but merely temporarily deforms them elastically without causing further damage.

Hence by means of the sensor, the control unit should be adequately able to detect the degree of severity of the accident as well.

In the side collision, long transit times between the impact site and the sensor of the control unit must be avoided, if the control unit is to trip the passenger protection system fast enough. It is therefore unfavorable to mount the sensor at a central point in the vehicle. The sensor must be mounted as close as possible to the impact site. The time between the onset of a side collision and the tripping of the air bag or the like must in fact generally be a few milliseconds (ms) at most, whereas a sensor mounted centrally in the vehicle often, because of the transit time, does not begin to detect the side collision until 10 ms later.

An intrinsically very fast-response sensor is also needed because otherwise the air bag could not be tripped until much too late even if this sensor, or a plurality of such sensors, were mounted in decentralized fashion at (a plurality of) points along the side of the vehicle, such as directly in the doors, and/or in the A, B and C pillars; see the accident situation illustrated in FIG. 3.

In general, the sensors of control units of a vehicle passenger protection system are acceleration or deceleration sensors, which detect the accelerations or decelerations of the vehicle—or more precisely, of the sensor—that occur spontaneously in the accident, or in other words which precisely measure the applicable values of acceleration or deceleration occurring in the sensor or which respond—at least roughly, often only qualitatively instead of quantitatively—to the particular accelerations or decelerations that are typical for such accidents. This type of sensor has a mechanical contact, for instance, which is touched or pushed by a seismic mass or by a body of the vehicle body that is deformed by the accident and which is thereby actuated; for example, see DE 22 12 190 A1, especially FIGS. 2–4;

DE 24 38 842 A;

DE 42 01 822 A1, especially column 3, lines 20–49; and

U.S. Pat. No. 5,032,696.

These sensors thus generally detect only whether a more or less precisely definable limit value for a deceleration or acceleration has or has not been exceeded. In other words, these sensors provide YES/NO statements, as it were a binary output signal, as a not very precise criterion for the onset of an accident. From the sensor output signal, one can no longer detect the course over time of the detected deformation of the vehicle. This mere YES/NO criterion is therefore hardly capable of tripping the passenger protection system individually in accordance with the severity of the accident, and hence of attaining an optimization of the gas pressure in the air bag in a way adapted to the severity of the accident. Such a purely YES/NO criterion certainly does not enable optimizing the firing time, whereas in relatively minor accidents, firing of the explosive charge should be delayed to the slightest possible extent, if firing is to be done at all.

Some such sensors are even preferred for detecting a side collision; see

DE 42 01 822 A1, especially FIG. 2;

British Patent 2,225,660, and

British Patent 2,244,378.

There are also sensors that are intended not so much to measure the deceleration or acceleration but rather the severity of the deformation of bodies of the vehicle body, and some of them are even expressly intended for detecting a side collision; see, for example the mechanical sensor, namely one that measures tensile forces, of British Patent 2,243,933;

the optical sensors of U.S. Pat. No. 4,988,862 and DE 37 16 168 A1, specifically FIG. 1 of the latter;

the hydraulic/piezoelectric sensor of U.S. Pat. No. 5,112, 079;

the inductive sensor of DE 42 01 822 A1, FIG. 4; and the capacitive sensor of EP 0 305 655 A2 and EP 0 305 655 B1.

In terms of their design, these sensors are suited, and intrinsically even frequently, for furnishing much more conclusive criteria for the severity of an accident than mere YES/NO statements—although some such known sensors nevertheless still have at their output a switch that furnishes only YES/NO statements to the electronics of the control unit. Analog output signals of the sensor—or quasi-analog output signals digitized by means of A/D converters, for instance—can in fact describe the severity of the accident still more accurately than the aforementioned sensor switches that provide purely YES/NO statements. For generating the output signal, such more-accurate sensors can in principle contain, instead of a switch, a component that furnishes the particular analog or quasi-analog output signal from which the control unit electronics can especially accurately detect the severity of the accident, namely the speed of the deformation, for example.

The last two references listed above,

EP 0 305 655 A2 and

EP 0 305 655 B1,
according to FIG. 1 of each, also describe that the side door is dented deeply in the accident, thus producing among other effects sonic oscillations, in other words vibrations in the form of airborne and structure-borne sound—evidently if, as suggested in these drawing figures, parts of the window glass break, producing a corresponding sharp report. In this connection it is mentioned in passing in the background sections of these references, in each case in the discussion of the prior art, that for accident detection, "sound sensors that are combined with a structure-borne sound sensor" have been proposed, but no source in the literature or other details of the construction of such a sensor combination are provided. The sound sensor in this combination thus detects above all the sonic VIBRATIONS that occur in the accident. All such microphones are at the same time air pressure sensors, which measure the air pressure oscillations and furnish analog or quasi-analog output signals.

SUMMARY OF THE INVENTION

The point of departure for the invention is the subject defined by the preamble to the claims which accordingly includes one—or more—air pressure sensors and which, as just noted, is mentioned in passing in the background sections of EP 0 305 655 A2 and EP 0 305 655 B1.

Sonic oscillation or vibration detectors, namely microphones, are also known per se in many versions, especially for burglar alarm systems, including in vehicles. These involve microphones stuck to the vehicle windows, for instance, which monitor the bursting of the windows.

The object of

- offering an especially fast-response control unit, which including its sensor is to be easy and hence economical to manufacture and install, without significant environmental burden in its use in the vehicle;
- being able especially reliably and at little effort or expense, from the deformation of the affected side portion, to distinguish a serious accident from a minor accident, that is, at little effort or expense, quite reliably—for the affected vehicle type if needed—to distinguish the side impact caused by another passenger car from the side impact caused by a bicycle or by a small animal, such as a rabbit, so that the passenger protection system control unit is tripped by the collision with the passenger car, but not by the collision with the bicycle or small animal,
- to that end, if at all possible, using a sensor that itself is low in weight, has a long service life, and takes up little space and is also suitable for fast detection of side collisions, with this sensor if at all possible being already known per se and readily available commercially, but also optionally adaptable to the special requirement,
- is attained in accordance with the invention by the subject defined by the claims. The invention accordingly makes use of the fact that in the accident, the air in the vehicle, and specifically the ambient air of the sensor, is compressed as soon as the vehicle deforms in the vicinity of the impact site.

Extensive tests have demonstrated that the pressure rise that occurs when the doors in the vehicle interior are shut is small in comparison with the pressure rise in a serious accident; the same is true if a soccer ball hits the side portion, or if a bicycle strikes it, or if high-powered radio speakers are mounted in the side portion. Special provisions for distinguishing such relatively harmless "accidents" or problems from the pressure rise caused by a serious accident, so that the passenger protection system will be tripped only in a serious accident, are therefore generally not needed.

With regard to sound waves, one usually thinks of more or less periodically alternating air vibrations in the form of overpressure and underpressure phases, which are propagated through the sound-bearing medium. The invention does not, however, relate primarily to the detection of sonic VIBRATIONS. Instead, the invention relates to the ascertainment and evaluation of the air SURGE or air pressure RISE that occurs in the accident, or in other words the accident-caused air compression, and therefore the invention uses a sensor that measures the AIR PRESSURE, even if in the individual case a microphone is employed. If a microphone is used as an air pressure sensor in the invention, however, then it is not primarily in order to detect the sound in the form of air vibrations, but rather primarily to detect the extremely low-frequency component of the sound, namely precisely the air pressure rise that corresponds to the compression of the air in the vehicle that is due to the accident.

It is true that the higher-frequency air vibrations are also superimposed, to a more or less pronounced extent, on this pressure rise evaluated in accordance with the invention. However, if a need for this should exist in an individual case, these higher-frequency air vibrations can also be specifically filtered out electronically or in some other way—in the electronics of the control unit or in the sensor itself—for instance with the aid of a low-pass filter, in order according to the invention to detect the air pressure rise. In some cases, and especially with some types of vehicle, it is possible in the invention for not only the air pressure rise but also a higher-frequency sound component, which is separately filtered out, to be evaluated by the control unit, in order not only to learn from the pressure rise whether the passenger protection system should or should not be tripped, but also for example to better ascertain the direction of a side collision and/or the impact site on the vehicle and from that to control the passenger protection system in a more-differentiated or more precise way, for instance in terms of the tripping time and/or the degree of inflation of an air bag and/or to trip more than one air bag instead of only a single air bag.

According to the invention, the sensor can detect the air pressure by means of a yielding diaphragm, for instance, whose motion can in principle be measured piezoelectrically or magnetically or capacitively, for instance, as is the case with many microphones. Accordingly, such sensors that ascertain the air pressure are also more or less suitable for detecting sonic vibrations. In the invention, however, they are in fact used to measure air pressure or to measure the pressure rises.

By appropriate crash tests, it is above all possible to ascertain the minimum value of the pressure rise intended to just barely still trip the passenger protection system, which is equivalent to a lateral collision with a heavy object, such as a truck or a sturdy tree, at a relative speed of 25 km/h, for example.

In the invention, the sensor thus detects a pressure rise that is tripped by the accident and that for example is largely adiabatic. Upon an especially rapid deformation of the side portion, the sensor optionally also detects in its ambient air the occurrence of a rapidly propagating pressure wave front, which has similarities to the leading pressure wave front that the nose end of high-speed vehicles and aircraft generates to their front and side, and which is generated by the deformation of a special part of the affected side portion—for instance by a dent in the side door caused by the collision.

Whether the adiabatically created component of the detected pressure rise is stronger than the component generated by the pressure wave front depends above all on how well the air space monitored by the sensor is self-contained, or in other words on whether this air space is surrounded by a largely sealed capsule or communicates with the open air through openings;

and on the size of this air space, measured in liters, for example.

The subjects recited in the dependent claims make it possible to attain additional advantage. Among others, the following advantages are attained by the additional provisions of the claim language:

in the output signals of the sensor, evaluating the frequencies that are especially typical for describing the pressure rise;

distinguishing serious accidents from minor accidents especially accurately by such assessment of the course of the air pressure over time;

(also) distinguishing serious accidents from minor accidents especially accurately by such assessment of the course of the air pressure over time;

(also) distinguishing serious accidents from minor accidents especially accurately by such assessment of the course of the air pressure over time;

(also) distinguishing serious accidents from minor accidents especially accurately by such assessment of the course of the air pressure over time, in that specifically in a side collision at an especially strongly reinforced point on the vehicle body—such as the B pillar—the control unit can utilize an additional criterion for the necessity or lack of necessity of tripping the passenger protection system; the control unit can then in fact either assess only the output signal of the acceleration and deceleration sensor as to for when tripping should be done, and/or whenever the output signals of the acceleration and deceleration sensor suggest a worrisomely serious accident, the control unit can also sharply lower the threshold for assessing the air pressure, so that tripping can already be done at relatively low air pressure rises;

being able to provide especially good protection immediately upon a collision with relatively soft parts of the door, which is especially dangerous;

evaluating additional assessment criteria by means of the additional sensor, for instance to enable ascertaining, more accurately than with only the air pressure sensor, the direction of impact, the speed of the collision, and/or the impact site on the vehicle; and (also) distinguishing serious accidents from minor accidents especially accurately by such assessment of the course of the air pressure over time.

BRIEF DESCRIPTION OF THE DRAWING

FIG. 5 is a block diagram of a control unit, the pressure sensor and a passenger protection system; and FIG. 6 is a block diagram incorporating additional sensors.

DESCRIPTION OF THE PREFERRED EMBODIMENT

The invention and further features thereof will be described in further detail below in terms of the illustrations shown in FIGS. 1–6 of exemplary embodiments of the invention, which have been shown as simply as possible for the sake of clarity.

Figure 1:
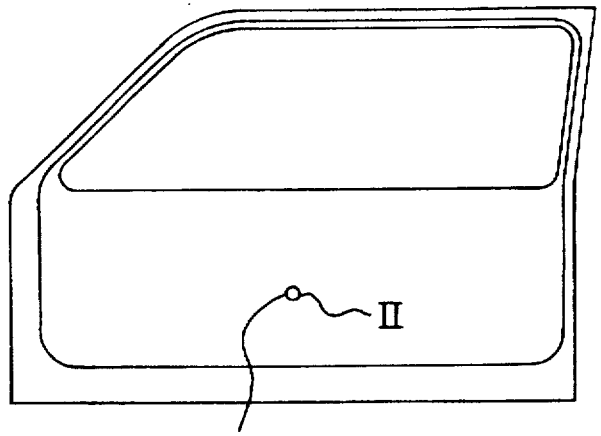
FIG. 1 is a front elevational view of a pressure senor disposed in a car door.
Figure 2:
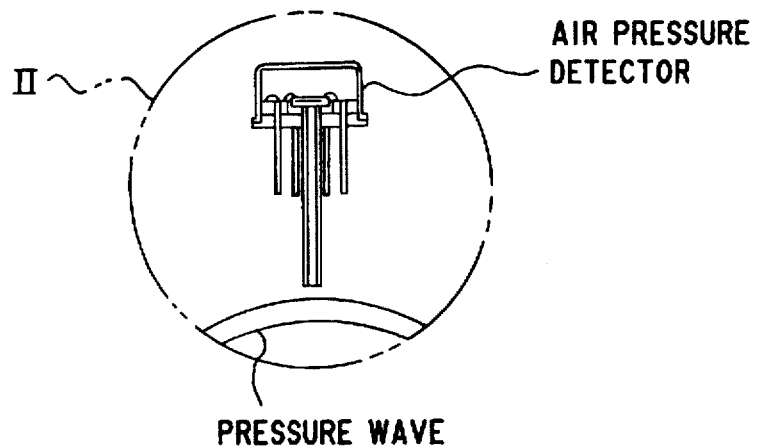
FIG. 2 is an enlarged, front elevational view of the pressure sensor.

FIG. 1 shows as an example the side door of a vehicle, with the sensor of the control unit according to the invention, where the sensor can be accommodated in the middle of the hollow space underneath the window glass, but the associated electronics of the control unit can be accommodated anywhere in the vehicle, for instance including centrally; and FIG. 2 shows an example of an air pressure sensor that can be used and that furnishes analog output signals.

FIG. 2 accordingly by way of example shows an air pressure sensor that can be used for the invention and that here is a semiconductor microphone and has a diaphragm whose air-pressure-dependent motion is measured, for instance on a piezoresistive principle. A different kind of microphone can also be used as the air pressure sensor, however, which operates by a piezoelectric, inductive or other principle, for example; it need merely (also) detect the extremely low-frequency components that correspond to the pressure rise within 1 ms or a few ms, for example. In the invention, an air pressure sensor without a diaphragm may also be used, one that for instance is a capsule deformable by air pressure and whose deformation is detected.

Figure 3:
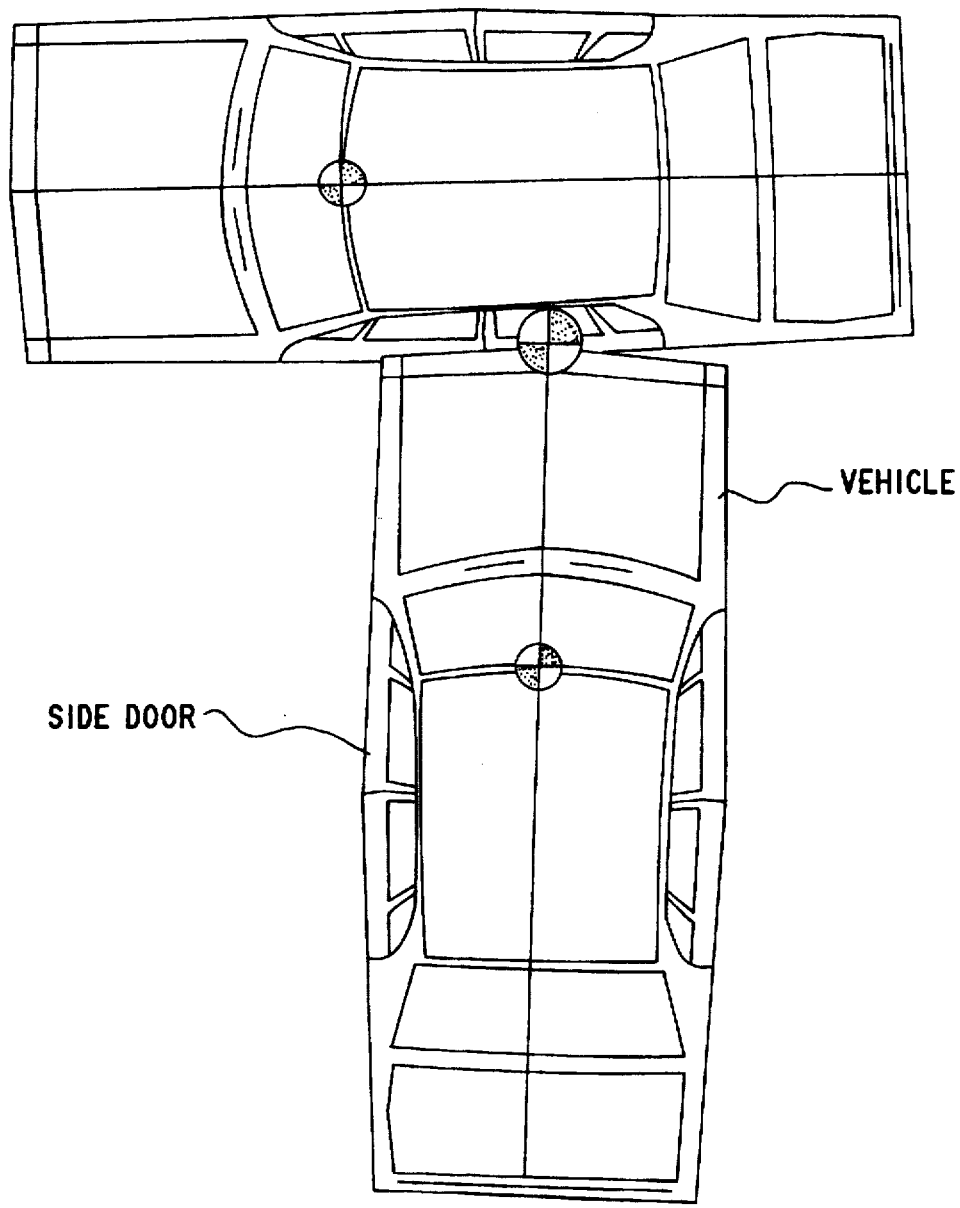
FIG. 3 is a top plan view of two automobiles involved in a side impact accident.
Figure 4:
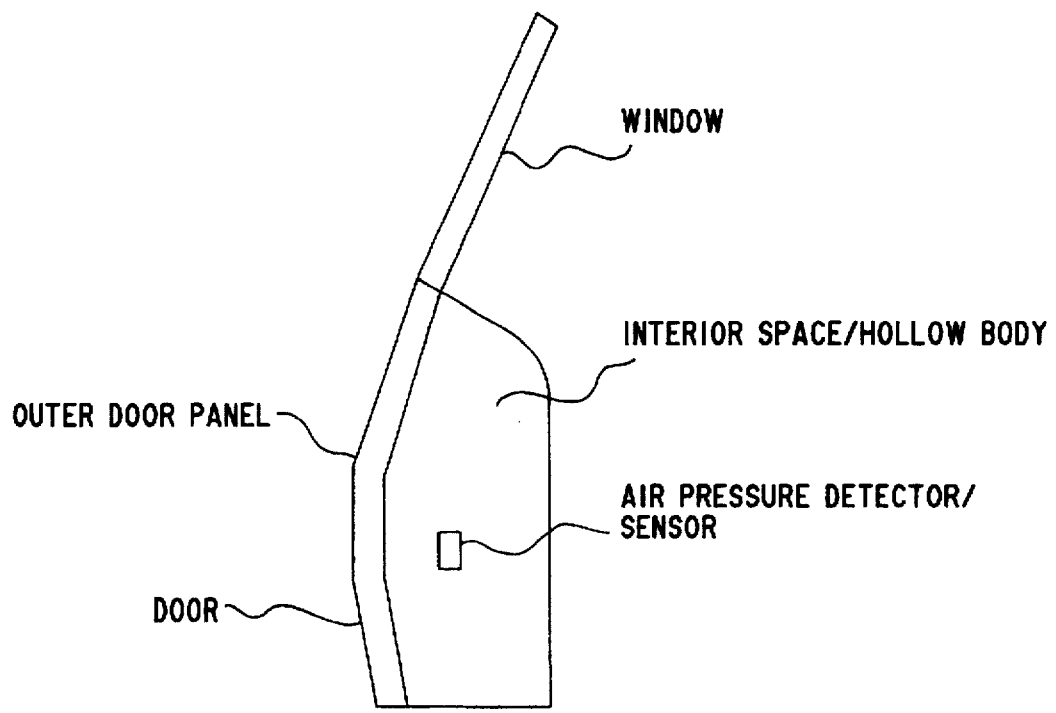
FIG. 4 is a side-elevational view of the pressure sensor in the car door.

In FIG. 1, this sensor is mounted by way of example centrally in the interior of the vehicle door, next to the outer skin of the door. The sensor may also, however, be mounted closed to any other side portion of the vehicle that can be deformed by the side collision. In an accident, as shown in FIG. 3, in which the affected side portion is deformed and thus the air pressure in the ambient air of the sensor is also compressed, this sensor furnishes the electronics, not shown in the drawings, of the passenger protection system control unit with output signals that are evaluated by the electronics. If from the output signals the electronics determine that a suitably serious traffic accident is occurring, then they trip the passenger protection system, or in other words its air bag, for example. A special feature of the invention is thus that the control unit evaluates the sudden pressure rise in the ambient air of the sensor that occurs in the traffic accident.

The sensor mounted in accordance with the invention can accordingly furnish analog or quasi-analog output signals that correspond more or less to the severity of the deformations and thus to an important aspect in assessing the severity of the accident. The course of the air pressure in the accident allows conclusions to be drawn about the course of the accident over time.

Moreover, the measured course of air pressure also more or less corresponds to the forces of deceleration or acceleration that occur in the accident and act upon the vehicle. Therefore in principle, the detected air pressure data can be evaluated similarly to output signals of acceleration and deceleration sensors, to control the passenger protection system in timely fashion in accordance with the severity of the accident. Thus from the detected course of air pressure, i.e., the analog or quasi-analog output signals, the control unit can also estimate the speed of the detected deformation and thus as needed also adapt the extent to which an air bag of the passenger protection system is inflated to the detected severity of the accident. The detected air pressure course moreover in principle even allows the control unit to optimize the time when the passenger protection system is tripped.

The severity of the accident and thus the optimal control of the passenger protection system must be ascertained especially accurately if a plurality of air pressure sensors according to the invention are provided, or if in addition to the invention some other kind of crash sensor is provided. The one crash sensor for instance can then be mounted especially close to the outer panel of the side portion of the vehicle—such as the door—and the second can for instance be mounted closer to a pillar, such as the B pillar of the vehicle. From the time difference and the dissimilar sonic amplitudes, one can in fact gain more or less accurate information about the direction of the impact and the impact site.

The transit time between the deformation of the affected side portion and the detection of the pressure rise is especially short, as test have shown. After merely fractions of a millisecond, a sensor that as in FIG. 1 is mounted in the center of the door can clearly detect the air pressure rise in the event of an impact in the vicinity of this door; this pressure rise is brief in comparison with the transit time between such an impact site and a sensor mounted centrally, such as in the steering column. Moreover, a microphone that intrinsically responds fast to the pressure rise can be used as the air pressure sensor, in other words one that is intrinsically suitable to recording relatively high sonic frequencies as well. As a result, the invention offers an especially fast-response control unit, which moreover, including its sensor, is in principle easy and hence economical to make and install, and furthermore without notably burdening the environment when it is used in the vehicle.

This sensor furthermore allows the control unit, at little overall effort or expense and nevertheless especially reliably, to draw conclusions, from the course over time of the pressure rise, about the course of deformation of the affected side portion, above all in order to distinguish between a severe and a minor accident. The control unit according to the invention can therefore quite reliably, at little effort and expense, and as needed for the applicable vehicle type, distinguish the side collision of another passenger car, for example, from the lateral impact of a bicycle or a small animal such as a rabbit, so that the control unit does trip the passenger protection system upon the collision with the passenger car, but does not do so upon the impact of the bicycle or small animal. The invention moreover makes it possible to use a sensor with little weight of its own, with a long service life and requiring little space, and even a readily commercially available air pressure sensor known per se—in fact, a microphone, for instance can be used, yet can be adapted as needed, for instance in terms of its outer form and possible ways of being fastened, to the specialized use contemplated.

Especially to enable evaluating the low frequencies, in the sensor output signals, that are especially typical for describing the pressure rise, the control unit can additionally filter the sensor output signals in terms of their frequency content and, depending on the vehicle type, in order to ascertain the air pressure rise, can preferentially evaluate the frequency range below a limit frequency, such as below 1 kHz.

In order by assessment of the course of the air pressure over time to be able to distinguish serious accidents from minor ones especially accurately, the electronics of the control unit can integrate the analog or quasi-analog air pressure values furnished by the sensor. The time integral over the pressure curve is intrinsically largely proportional to the deformation energy that the door absorbs, and hence is a possible measure for the severity of the accident. Integrations of sensor output signals are already known in numerous versions for control units of passenger protection systems, such as

EP 0 440 133 A2,

EP 0 327 853 B, and

DE 41 17 811 A.

In order by assessment of the course of the air pressure over time to be able to distinguish serious accidents from minor ones especially accurately, the control unit can additionally ascertain the steepness of the pressure rise in the ambient air of the sensor that is tripped by the side collision, for instance by later finding the difference between the just-ascertained value of the integral and the value of the integral ascertained just previously to it, so as to trip the passenger protection system only if minimum steepness values are exceeded.

In order to be able to distinguish serious accidents from minor ones especially accurately by assessing the course of the air pressure over time, the control unit may also—in addition, or as an alternative - ascertain the amplitudes of the pressure rise in the ambient air of the sensor that is tripped by the side collision, in order to trip the passenger protection system only if a minimum amplitude is exceeded.

A special further feature of the invention makes it possible to distinguish serious accidents from minor ones especially accurately by assessing the course of the air pressure over time. That is, if as in FIG. 4 the sensor of the invention is for instance mounted centrally in the interior of the door, but the side collision occurs laterally of it, for instance at an especially strongly reinforced point on the body—such as the B pillar—then in limit cases the measured air pressure rise per se is still just low enough not to trip the passenger protection system, even though ideally, because of the objective severity of this accident the passenger protection system should perhaps already have be tripped. To enable the control unit, if the collision atypically occurred at such an especially reinforced point, to utilize an additional criterion for the necessity or lack of necessity of tripping the passenger protection system, the control unit can additionally include an acceleration or deceleration sensor that detects the side collision and the control unit can trip the passenger protection system even whenever, even if the air pressure sensor output signals do not yet by themselves furnish an adequate criterion for tripping the passenger protection system, nevertheless the output signals of the acceleration or deceleration sensor at least in combination with the output signals of the air pressure sensor—furnish an adequate criterion for tripping the passenger protection system.

To provide especially good protection in the especially dangerous instance of impact directly at the especially soft parts of the door, the space in the door within which the sensor is mounted can be embodied at least largely as a sealed capsule, instead of being relatively air-permeable toward the vehicle interior. Thus if the affected side portion—especially if it is a side door—the sensor is secured as in FIG. 1 approximately near the center of the hollow space that is more or less closed all the way around and more or less forms a sealed capsule, then the air pressure rise measured by the sensor upon a collision with this encapsulated side portion, that is, as soon as this side portion is deformed, is especially steep and high and is thus especially significant.

Furthermore, the sensor also reacts especially fast if it is mounted approximately in the center of the side portion embodied as a more or less sealed hollow space. In statistical terms, the impact site in the event of an accident is thus approximately equally likely to be near the center as near the edges of the outer shell of the side portion. Yet the transit time of the deformation-tripped pressure wave between the affected impact site on the one hand and the sensor on the other is therefore optimized, or in statistical terms minimized, as soon as the sensor is mounted approximately in the center inside the hollow space of the side portion.

To enable evaluating additional assessment criteria by means of the additional sensor, for instance in order to ascertain the direction of impact, speed of impact and/or impact site on the vehicle more accurately than with the air pressure sensor alone, the control unit can also include a further sensor as shown in FIG. 6, which is not used, or is not exclusively used, to monitor air pressure. This further sensor can also react to different criteria than the air pressure rise, for instance as in one of the prior art references mentioned above. In particular, a single special complete sensor which is described in these references—or a plurality of such sensors—can be spatially combined with the invention to make a sensor group, in order by means of the differing response behavior of these sensors, and/or by means of the differing way in which or locations at which these sensors are secured in the vehicle, to be able even more precisely and/or even faster than with an air pressure sensor alone according to the invention, for instance to ascertain the angle of impact and/or the impact site on the vehicle and/or the severity of the accident, such as the speed with which the vehicle deforms in as well-differentiated or precise a way as possible.

To enable especially accurate detection of the severity of the accident the control unit can accordingly be mounted in the side portion, for instance together with a structure-borne sound sensor, so that this sensor group additionally evaluates structure-borne sound that occurs at markedly higher frequencies, such as between 10 kHz and 100 kHz. Since in general the air pressure sensor may be embodied by a microphone, this microphone can in principle also act as a structure-borne sound sensor. One can also install filters as shown in FIG. 5, which enable the control unit separately to evaluate the air pressure rise and the structure-borne sound according to the invention. In this example as well, one can additionally gain indications of the direction of impact and the site of impact from the time differences between the sensor output signals and from their dissimilar amplitudes.

We claim:

1. In combination with a vehicle having a body with a side, a control assembly for a passenger protection system of the vehicle which is to be tripped upon the occurrence of a traffic accident with a side impact, the control assembly comprising:

at least one detector adapted to detect a pressure rise in a hollow body, said at least one detector being mounted in a largely enclosed side portion of the side of the vehicle body defining the hollow body; and a control unit connected to and receiving signals from said at least one detector, said control unit evaluating a sudden and largely adiabatic air pressure rise detected by said detector upon a side impact collision.

2. The combination according to claim 1, wherein the vehicle body has a side door including the side portion of the vehicle, and the side door has an outer steel panel, said at least one detector being one of a piezoelectric and a piezoresistive piezomicrophone disposed centrally in an interior of a side door near the outer steel panel.

3. The combination according to claim 1, wherein the vehicle body has a side door including the side portion of the vehicle, and the side door has an outer steel panel, said at least one detector being a pressure sensor capacitively or inductively detecting a diaphragm motion and being disposed centrally in an interior of the side door near the outer steel panel.

4. The assembly according to claim 1, wherein said control unit filters output signals received from said at least one detector in accordance with a frequency content thereof, and said control unit evaluating a frequency range below a given limit frequency.

5. The assembly according to claim 1, wherein said at least one detector issues analog or guasi-analog signals representing a pressure value, and said control unit integrates the signals furnished by the sensor.

6. The assembly according to claim 1, wherein said control unit ascertains a steepness of the pressure rise at the at least one detector, and said control unit trips the passenger protection system only if the ascertained steepness exceeds a minimum steepness value.

7. The assembly according to claim 1, wherein said control unit ascertains an amplitude of the pressure rise at said at least one detector, and said control unit trips the passenger protection system only if the ascertained amplitude exceeds a minimum amplitude.

8. The assembly according to claim 1, which further comprises an acceleration/deceleration sensor adapted to detect the side impact collision and outputting an acceleration signal, and said control unit tripping the passenger protection system whenever, although the output signals of said at least one detector representing the air pressure rise does not yet furnish an adequate criterion for tripping the passenger protection system, the acceleration signal of said acceleration/deceleration sensor furnishes an adequate criterion for tripping the passenger protection system.

9. The assembly according to claim 8, wherein said control unit combines the signals output by said at least one detector and said acceleration/deceleration sensor, and trips the passenger protection system as a function of the combined signals.

10. The assembly according to claim 1, wherein the vehicle body has a side door including the side portion of the vehicle, and said at least one detector is mounted in the hollow space defined in the side door, the hollow space representing a substantially sealed capsule.

11. The assembly according to claim 1, which further comprises a sensor mounted in the vehicle which is not an air pressure sensor.

12. The assembly according to claim 1, which further comprises a sensor mounted in the vehicle which does not exclusively monitor air pressure.

13. The assembly according to claim 1, which further comprises a structure-borne sound sensor connected to said control unit, and said control unit evaluates structure-borne sound in the side portion at relatively higher frequencies.

14. The assembly according to claim 13, wherein the relatively higher frequencies are defined between 10 kHz and 100 kHz.

15. In combination with a vehicle having a body with a side, a control assembly for a passenger protection system of the vehicle which is to be tripped upon the occurrence of a traffic accident with a side impact, the control assembly comprising:

at least one detector adapted to detect a pressure rise in a hollow body, said at least one detector being mounted in a largely enclosed side portion of the side of the vehicle body defining the hollow body;

a control unit connected to and receiving signals from said at least one detector, said control unit evaluating a sudden and largely adiabatic air pressure rise detected by said detector upon a side impact collision; and said control unit filtering output signals received from said at least one detector in accordance with a frequency content thereof, and said control unit evaluating a frequency below 1 kHz.

16. A control system for tripping a vehicle passenger protection system upon a side collision, comprising:

at least one air pressure detector as a sensor in a largely enclosed side portion of the vehicle defining a hollow body; and a control unit evaluating a sudden pressure rise in ambient air about said sensor occurring in a side collision.

* * * * *